Aug. 23, 1949.                J. R. WIEGAND                2,479,656
                          INTERCEPTOR TRANSFORMER
                          Filed Sept. 21, 1946
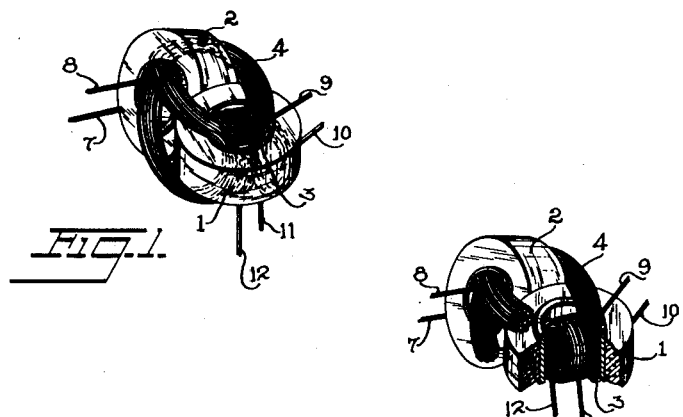
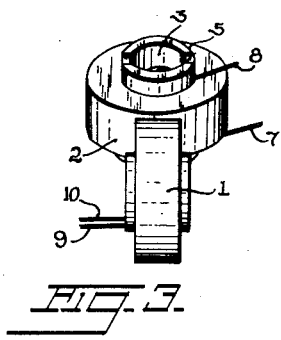
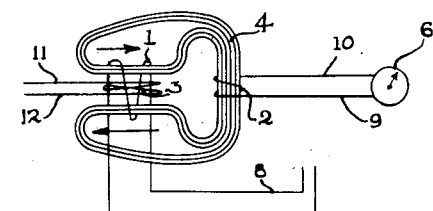
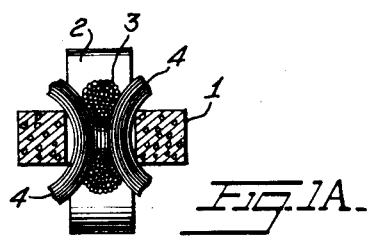
INVENTOR
JOHN R. WEIGAND
BY
ATTORNEY Patented Aug. 23, 1949

2,479,656

UNITED STATES PATENT OFFICE 2,479,656

INTERCEPTOR TRANSFORMER

John R. Wiegand, New Hyde Park, N. Y.

Application September 21, 1946, Serial No. 698,496

3 Claims. (Cl. 171—119).

This invention relates to electrical control devices in which a small current is utilized to control the magnitude of a larger current, and more particularly to devices of this type in which a normally magnetically balanced structure is unbalanced by the control current.

An object of the invention is to provide a magnetic device in which the magnitude of a very small control current may be utilized to control the magnitude of a secondary current produced by energy derived from a source of alternating current.

A further object of the invention is to provide a transformer in which the degree of electromagnetic coupling between two of the windings is controlled by the magnitude of a control current flowing in a third winding.

Another object of the invention is to provide a highly sensitive electromagnetic control in which the current delivered to an indicator or other energy utilization device may be varied in accordance with the magnitude of an extremely small control current such as currents of the order of magnitude which would be delivered by a thermocouple, a photocell of the copper oxide type or other devices which produce a very small current.

A further object of the invention, in the case of an alternating current of the same frequency as the primary supply current, is to provide a device which will respond not only to changes in magnitude of the control current, but also to changes in the phase angle of the control current.

From another aspect, the invention contemplates a high degree of potential magnetic coupling between the energizing winding and the utilization winding, the degree of coupling being normally slight and being subject to a high degree of control by the control winding.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of an embodiment of the invention.

Fig. 1A is a sectional view of Fig. 1 taken through the primary winding and looking toward the secondary winding.

Fig. 2 is a perspective view of the embodiment shown in Fig. 1, partly broken away.

Fig. 3 shows a modification of the invention.

Fig. 4 is schematic circuit diagram illustrating the operation of the invention.

Referring to Fig. 1, a primary winding 1 is adapted to be energized from a source of alternating current. A secondary winding 2 is located with its magnetic axis substantially at right angles to that of the primary winding 1. A control winding 3 is disposed in the central portion of the primary winding 1 with its magnetic axis mutually perpendicular to the magnetic axes of windings 1 and 2. A core 4, which may be formed from a magnetic wire or other suitable magnetic material passes through the openings in the windings 1 and 2, thus linking them together magnetically, but the core is doubled back on itself so that flux developed by primary winding 1 passes once through winding 2 in one direction and again in the opposite direction, thus leaving a net flux in winding 2 which is of extremely small magnitude. By careful adjustment, this net flux may be made as small as may be desired.

The control winding 3 is disposed between the two adjacent portions of core 4 as it passes twice through coil 2. Energization of coil 3 produces a field which is transverse of these portions of core 4 thus disturbing the magnetic balance and yielding a net flux of appreciable magnitude. Since the net flux is produced by the alternating current which energizes coil 1, it in turn generates alternating voltage in the secondary coil 2. The magnitude of this voltage is determined in part by the amount of flux in core 4 and in part by the degree of unbalance produced by coil 3.

Fig. 2 shows more clearly than Fig. 1, the disposition of control coil 3 within primary coil 1.

A modification of the invention is illustrated in Fig. 3, the coils 1, 2 and 3 being positioned as before with their magnetic axes mutually perpendicular, but the solid core 5 is located within the primary winding 1 and secondary winding 2 is located within core 5 as is likewise control coil 3.

In Fig. 4 the primary coil 1 is energized by alternating current supplied via conductors 7 and 8. An indicator 6 is connected via conductors 9 and 10 to secondary winding 2. A control current is applied to control coil 3 via conductors 11 and 12. The double looping of core 4 is illustrated schematically and, therefore, does not show the relative dimensions of the flux paths which are to be observed in Fig. 1. Application of energy to coil 3 unbalances these flux paths permitting flux produced by coil 1 to link coil 2 and thus generate a voltage therein which may be read on indicator 6.

It is to be noted that the control winding may be utilized to cause a secondary current having an extremely slight initial value to be increased in value. The secondary current may also have an appreciable initial value, and the control current may be utilized to reduce the initial value to a lower value, if desired. In fact, any form of operation in which the control current produces a change in the amount of secondary current may be found to be useful, depending upon the particular application for which the invention is to be used.

It is found by actual test that the intercepter transformer is most efficient when:

1. the primary coil has a current density of .008 amperes per 10 circ. mils and is above 100 volts.
2. the flux density is 35,000 per sq. inch (core area).
3. the intercepting current coil be at least 10 turns.
4. the intercepting current permits induction between secondary and primary beginning with less than .0001 volt but diminishes in efficiency above 6 volts.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An electrical control device, comprising a primary winding adapted to be energized from a source of alternating current, a secondary winding positioned adjacent said primary winding with its magnetic axis substantially at right angles to that of the primary winding, a control winding in said primary winding having its magnetic axis extended parallel to the magnetic axis of said secondary winding, and a core passing through openings in the primary and secondary windings to magnetically link the same.

2. An electrical control device, comprising a primary winding adapted to be energized from a source of alternating current, a secondary winding positioned adjacent said primary winding with its magnetic axis substantially at right angles to that of the primary winding, a control winding in said primary winding having its magnetic axis extended parallel to the magnetic axis of said secondary winding, and a core passing through openings in the primary and secondary windings to magnetically link the same, said core being engaged through said openings so that magnetic flux created in said core will pass through said primary and secondary windings in one direction and through said primary and secondary windings in the opposite direction.

3. In an electrical control device, three windings, two of said windings being disposed adjacent one another with their axes at right angles to each other, the third winding being disposed within one of said two windings with its axis parallel to the other of said two windings, and a magnetizable core shaped to interlink magnetically the said two windings in substantially equal and opposite degree and being further shaped to be influenced by energization of the said third winding to interlink magnetically the interlinked two windings in appreciable degree.

JOHN R. WIEGAND.

REFERENCES CITED

The following references are of record in the file of this patent:

UNITED STATES PATENTS

| Number | Name | Date |
| --- | --- | --- |
| 815,863 | Rollinson | Mar. 20, 1906 |
| 1,793,213 | Dowling | Feb. 17, 1931 |
| 1,862,204 | Sorensen | June 7, 1932 |
| 1,862,212 | Dowling | June 7, 1932 |
| 1,891,044 | Dowling | Dec. 13, 1932 |
| 1,910,381 | Dowling | May 23, 1933 |